US009637212B2

(12) United States Patent
Cottet et al.

(10) Patent No.: US 9,637,212 B2
(45) Date of Patent: May 2, 2017

(54) AIRCRAFT BODY MOUNTED ENERGY ABSORBING RUB STRIP

(71) Applicant: The Boeing Company, Seal Beach, CA (US)

(72) Inventors: Justin D Cottet, Snohomish, WA (US); Roger S Kepner, Lynnwood, WA (US); Michael L Drake, Belleveu, WA (US)

(73) Assignee: THE BOEING COMPANY, Chicago, IL (US)

( * ) Notice: Subject to any disclaimer, the term of this patent is extended or adjusted under 35 U.S.C. 154(b) by 100 days.

(21) Appl. No.: 14/249,576

(22) Filed: Apr. 10, 2014

(65) Prior Publication Data
US 2015/0336654 A1    Nov. 26, 2015

(51) Int. Cl.
*B64C 25/00* (2006.01)
*B64C 25/58* (2006.01)
(Continued)

(52) U.S. Cl.
CPC .............. *B64C 1/06* (2013.01); *B32B 3/12* (2013.01); *B32B 15/01* (2013.01); *B32B 15/015* (2013.01); *F16F 7/12* (2013.01); *B32B 2307/558* (2013.01); *B32B 2307/722* (2013.01); *B32B 2311/18* (2013.01); *B32B 2311/22* (2013.01); *B32B 2311/24* (2013.01); *B32B 2605/18* (2013.01); *B64C 2025/005* (2013.01)

(58) Field of Classification Search
CPC  B64C 1/06; B64C 1/061; B64C 1/062; B64C 1/068; B64C 7/00; B64C 25/00; B64C 2025/00; B64C 2025/05; F16F 7/121; B60R 19/18

USPC .......................................... 244/121; 293/133
See application file for complete search history.

(56) References Cited

U.S. PATENT DOCUMENTS 1,694,873 A * 12/1928 Brunner .................. B64B 1/005
 244/100 A
4,227,593 A * 10/1980 Bricmont ................ F16F 7/121
 293/133

(Continued)

OTHER PUBLICATIONS

International Searching Authority, European Patent Office; International Search Report and Written Opinion; PCT/US2015/010964 dated Mar. 23, 2015.

(Continued)

*Primary Examiner* — Marc Burgess
(74) *Attorney, Agent, or Firm* — Parsons Behle & Latimer (57) ABSTRACT

An energy absorbing rub strip having a core material and a fairing positioned over the core material. The core material may be configured to buckle under the application of a predetermined amount of force and the fairing may be configured to be attached to a fuselage of an aircraft. The fairing may be made out of an abrasive-resistant material such as titanium or a nickel-based metal. The core material may be comprised of an aluminum honeycomb. The core material may be comprised of a dual density material. The length of the rub strip may extend beyond potential contact points on the fuselage during landing and takeoff. Upon a ground contact event, the thickness of deformed/buckled core material may be measured to determine if the ground contact event may have caused structural damage to the aircraft.

19 Claims, 7 Drawing Sheets

(51) Int. Cl.
*B64C 1/06* (2006.01)
*B32B 15/01* (2006.01)
*B32B 3/12* (2006.01)
*F16F 7/12* (2006.01)

(56) References Cited

U.S. PATENT DOCUMENTS

| | | | |
|---|---|---|---|
| 4,411,380 A | 10/1983 | Mcwithey et al. | |
| 4,815,678 A | 3/1989 | Gawne | |
| 5,069,318 A * | 12/1991 | Kulesha | B29D 99/0003 244/117 R |
| 5,542,626 A | 8/1996 | Beuck et al. | |
| 5,927,646 A * | 7/1999 | Sandy | B64C 25/52 244/108 |
| 6,098,767 A * | 8/2000 | Unrath | F16F 7/12 188/371 |
| 6,245,408 B1 * | 6/2001 | Bitzer | F16F 7/121 428/118 |
| 6,523,450 B1 * | 2/2003 | Schreiber | F41H 5/0428 244/121 |
| 6,938,936 B2 | 9/2005 | Mooijman et al. | |
| 6,959,894 B2 * | 11/2005 | Hayashi | B64C 1/062 244/117 R |
| 7,566,489 B2 * | 7/2009 | Starke | B32B 3/28 244/123.12 |
| 7,997,529 B2 * | 8/2011 | Koch | B64C 1/062 244/117 R |
| 8,215,686 B2 | 7/2012 | Czopek et al. | |
| 8,371,530 B2 | 2/2013 | Bautista De La Llave et al. | |
| 2008/0048462 A1 | 2/2008 | Zabik | |
| 2010/0243798 A1 * | 9/2010 | Nakazawa | B29C 70/545 244/108 |
| 2011/0049295 A1 * | 3/2011 | Mairou | B64C 25/64 244/121 |
| 2012/0187717 A1 | 7/2012 | Tanaka et al. | |

OTHER PUBLICATIONS

International Bureau of WIPO; International Preliminary Report on Patentability for Application No. PCT/US2015/01964 dated Oct. 20, 2016.

* cited by examiner

AIRCRAFT BODY MOUNTED ENERGY ABSORBING RUB STRIP

FIELD OF THE DISCLOSURE

An energy absorbing rub strip attached to the exterior of a fuselage of an aircraft that may prevent damage to the fuselage during a contact event. The rub strip may be comprised of a crushable core material covered with an abrasive-resistant fairing connected to the exterior of the fuselage adjacent to a passenger compartment. The rub strip may be positioned over a first potential contact point to potentially protect the fuselage if contact is made with the ground during takeoff of the aircraft. The rub strip may also be positioned over a second potential contact point to potentially protect the fuselage if contact is made with the ground during landing of the aircraft.

BACKGROUND

Figure 6:
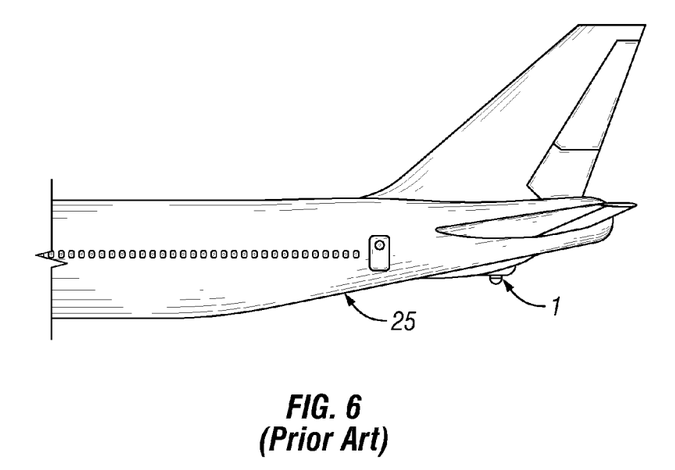
FIG. 6 shows a prior art tail absorber.

During landing and takeoff of an aircraft, it is possible that a portion of the fuselage of the aircraft may contact the ground if the incidence angle of the aircraft is too great. Aircraft having a higher probability of a ground strike during landing and takeoff may include a tail absorber to protect the fuselage in the event of a ground strike. FIG. 6 shows an aircraft having a tail absorber 1 protruding through the fuselage 25. A portion of the tail absorber 1 protrudes below the fuselage 25, so in the event that there is a ground strike during takeoff or landing, the tail absorber 1 contacts the ground instead of a portion of the fuselage 25.

The tail absorber 1 (shown in FIG. 6) is adapted to absorb the energy from the ground strike. For example, the tail absorber 1 typically includes a telescopic mechanism within the fuselage 25 that crushes a crushable cartridge upon contact with the portion protruding below the fuselage 25 in an effort to absorb the energy from the ground strike. The cartridge may then be replaced with a new cartridge so that the system can potentially provide further protection against damage to the fuselage of the aircraft in the event of a ground strike. The typical tail absorber 1 mechanism may weigh approximately 350 lbs and provides protection against damage to the aircraft for ground strikes at a velocity near 5 feet per second. As the tail absorber 1 protrudes through the fuselage 25, the tail absorber is typically positioned behind the bulkhead isolating the fuselage from the pressurized passenger compartment. The introduction of advanced flight control laws that act as electronic tail strike protection systems has reduced the occurrences of ground strikes during landing and takeoff procedures. Further, advanced flight control law systems have reduced the force of a ground strike when it does occur. With advanced flight control systems a ground strike, will likely have a velocity of less than half of what was previously designed to protect. With the advent of advanced flight control laws, it would be beneficial to provide a fuselage protection mechanism that overcomes the potential disadvantages of the prior tail absorbing mechanisms. The present disclosure is directed to overcoming these disadvantages.

SUMMARY

One embodiment of an energy absorbing rub strip comprises a core material, the core material being configured to buckle under the application of a predetermined amount of force and a fairing positioned over the core material, the fairing being configured to be attached to a fuselage of an aircraft. The rub strip may further comprise at least two mounting rails attached to the fairing, wherein the fairing is connected to a fuselage of an aircraft via the mounting rails. The fairing and the at least two mounting rails may be comprised of titanium. The core material may be comprised of an aluminum honeycomb. The core material may be comprised of a dual density material. The fairing may be comprised of titanium or a nickel-based metal. The rub strip may have a length that extends beyond a potential expected landing contact point and a potential expected takeoff contact point on an aircraft fuselage.

One embodiment of a method of using an energy absorbing rub strip on an aircraft fuselage comprises positioning an abrasion-resistant fairing around an exterior portion of a core material to form an energy absorbing rub strip, the core material being configured to buckle under the application of a predetermined amount of force and connecting the energy absorbing rub strip to an exterior portion of a fuselage of an aircraft. The method may further comprise connecting the energy absorbing rub strip to the fuselage of the aircraft adjacent to a passenger compartment of the aircraft. The method may further comprise connecting the energy absorbing rub strip to the fuselage over a potential expected landing contact point and over a potential expected takeoff contact point. The method may include determining a thickness of core material deformed upon contact with the ground and determining if contact with the ground caused any structural damage to the fuselage based on the thickness of deformed core material. The method may further comprise replacing the abrasion-resistant fairing and the core material with a second abrasion-resistant fairing around an exterior portion of a second core material to form a second energy absorbing rub strip.

One embodiment is an aircraft comprising a fuselage, a passenger compartment within an interior of the fuselage, a bulkhead separating the passenger compartment from an end of the fuselage with a tail, and a rub strip attached to an exterior of the fuselage adjacent to a portion of the passenger compartment. The rub strip comprising an abrasion-resistant fairing around an exterior portion of a core material. The core material may be configured to buckle under the application of a predetermined amount of energy. The core material may be comprised of an aluminum honeycomb. The core material may be comprised of material having a variable density such as a dual density material. The abrasion-resistant fairing may be comprised of titanium or a nickel-based metal. The rub strip may have a length that extends beyond a potential expected landing contact point on the fuselage and a potential expected takeoff contact point on the fuselage.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

Figure 1:
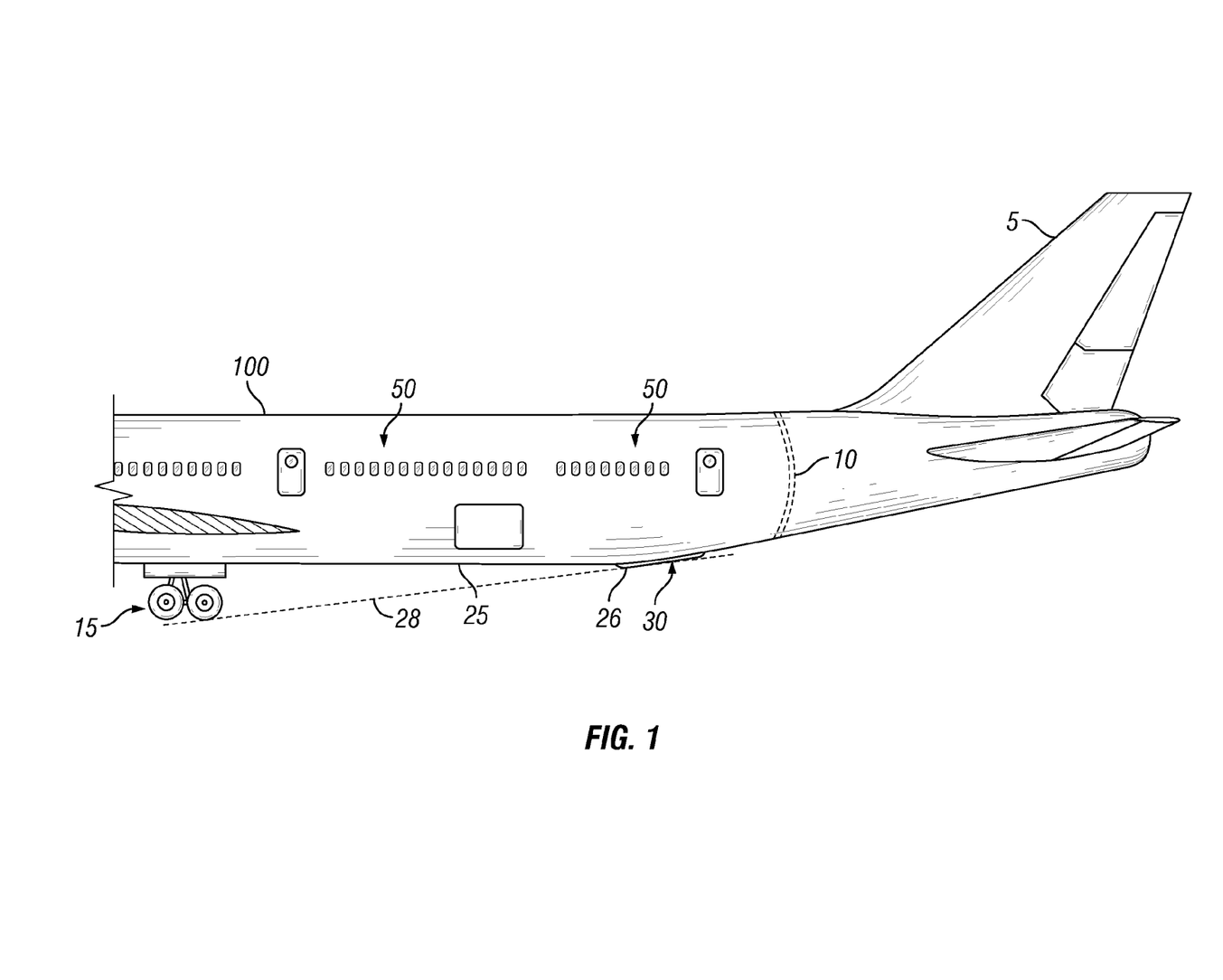
FIG. 1 shows a portion of an aircraft having an embodiment of a rub strip with the landing gear in a landing configuration.

FIG. 1 shows a schematic of an aircraft 100 having an embodiment of an energy absorbing rub strip 30 connected to the fuselage 25 near the tail 5 end of the aircraft 100. The rub strip 30 is positioned adjacent the passenger compartment 50 of the aircraft 100. As the rub strip 30 does not penetrate the skin of the fuselage 25, the rub strip 30 can be positioned adjacent the pressurized passenger compartment 50. A bulkhead 10 separates the pressurized passenger compartment from the tail 5 end of the aircraft 100. The landing gear 15 of the aircraft 100 is in a landing configuration and FIG. 1 shows the vector 28 from the landing gear 15 in the landing configuration to a potential initial contact point 26 on the fuselage if a contact event occurs during landing of the aircraft 100. The rub strip 30 is positioned along the bottom exterior of the fuselage to cover the potential initial contact point 26 during a contact event during landing and extends along the fuselage to cover the length of fuselage 25 that may also potentially contact the ground during a landing.

Figure 2:
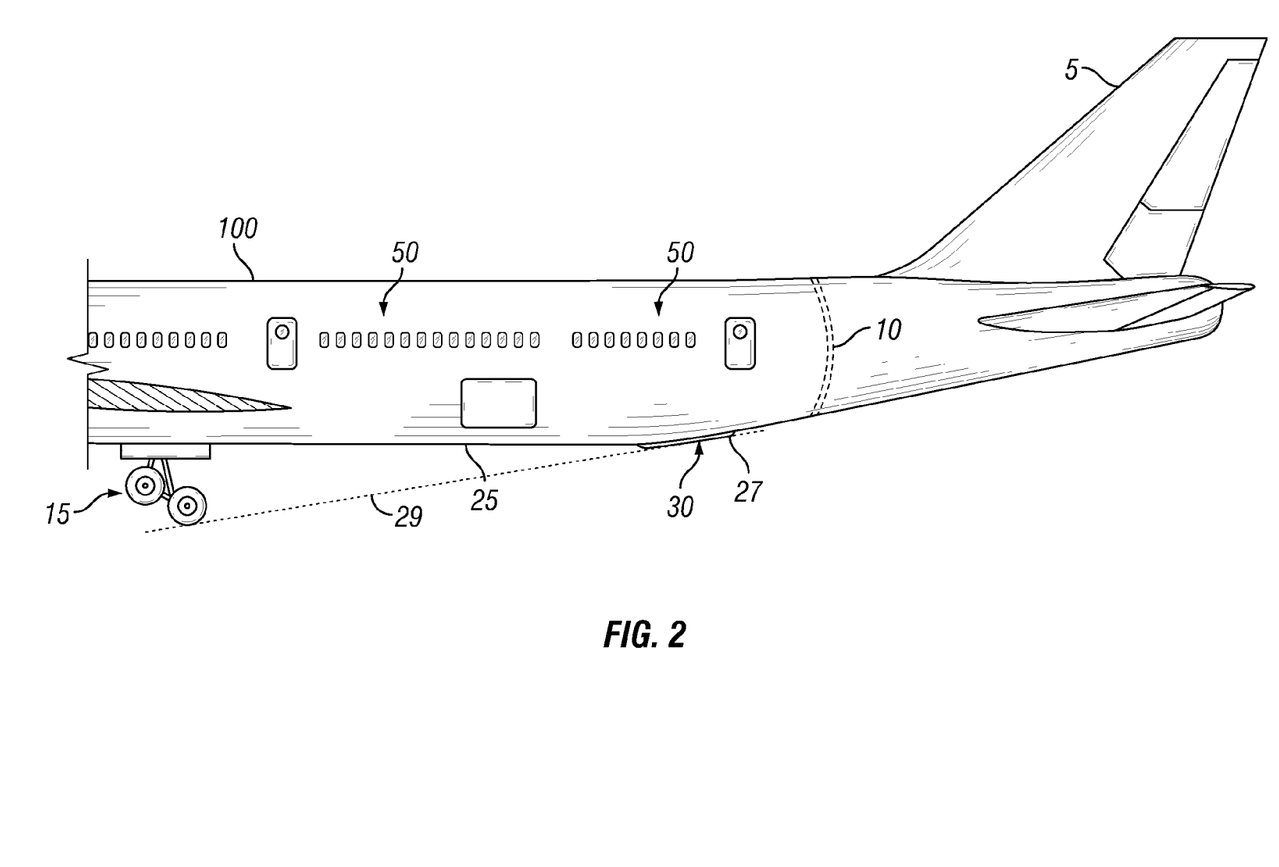
FIG. 2 shows a portion of an aircraft having an embodiment of rub strip with the landing gear in a takeoff configuration.

FIG. 2 shows a schematic of an aircraft 100 having an embodiment of an energy absorbing rub strip 30 connected to the fuselage 25 near the tail 5 end of the aircraft 100. The rub strip 30 is positioned adjacent the passenger compartment 50 of the aircraft 100. A bulkhead 10 separates the pressurized passenger compartment from the tail 5 end of the aircraft 100. The landing gear 15 of the aircraft 100 is in a takeoff configuration and FIG. 2 shows the vector 29 from the landing gear 15 in the takeoff configuration to a potential initial contact point 27 on the fuselage if a contact event occurs during takeoff of the aircraft 100. The rub strip 30 is positioned along the bottom exterior of the fuselage to cover the potential initial contact point 27 during a contact event during takeoff and extends along the fuselage to cover the length of fuselage 25 that may also potentially contact the ground during a takeoff. Preferably, the rub strip 30 has a length that extends beyond both the potential initial contact point 26 along the fuselage 25 for a contact event during landing and the potential initial contact point 27 along the fuselage 25 for a contact event during takeoff.

Figure 3:
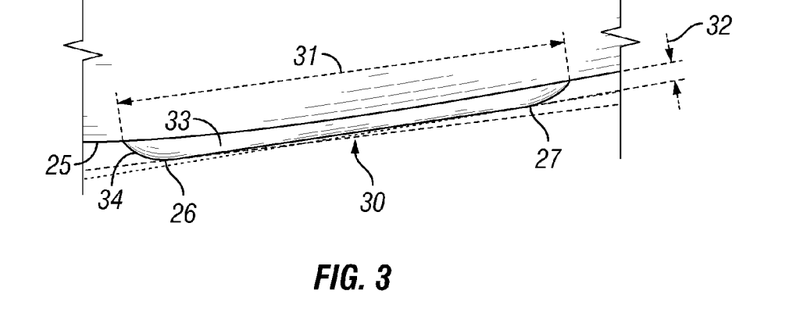
FIG. 3 shows an embodiment of a rub strip attached to a portion of a fuselage.

FIG. 3 shows a close-up schematic of a rub strip 30 connected to the fuselage 25 of an aircraft 100 adjacent the passenger compartment 50. The rub strip 30 has a length 31 that extends forward of potential initial contact point 26 and rearward of potential initial contact point 27. The rub strip 30 may be connected to the fuselage 25 by a plurality of fasteners as would be appreciated by one of ordinary skill in the art having the benefit of this disclosure. The rub strip 30 includes a core material 33 having a thickness 32 that is configured to buckle or be crushed upon the application of force such as during a touch down event. The thickness 32 of the core material 33 may be a predetermined thickness estimated to withstand the force exerted on the rub strip 30 during a potential contact event in an effort to prevent damage to the skin and/or fuselage 25 of the aircraft 100. The core material 33 may be a material that buckles upon a touch down event protecting the fuselage 25 from being damaged. For example, the core material 33 may be a honeycomb material such as an aluminum honeycomb. An aluminum honeycomb is a lightweight core material that offers excellent strength and corrosion resistance that may be comprised of a plurality of hexagonal shaped tubes, known as cells, of aluminum connected together. The core material 33 may be fabricated from aluminum honeycomb purchased from PLASCORE® of Zeeland, Mich. The rub strip 30 includes a fairing 34 that covers the exterior of the core material 33. The fairing 34 may be connected to the fuselage 25 via a plurality of fasteners as would be appreciated by one of ordinary skill in the art having the benefit of this disclosure. The fairing 34 may be comprised of various abrasion-resistant materials. For example, the fairing 34 may be titanium or a nickel-based metal. A fairing comprised of an abrasion-resistant material may decrease the impact force in the event of a contact event during landing and/or takeoff of an aircraft 100.

Figure 4:
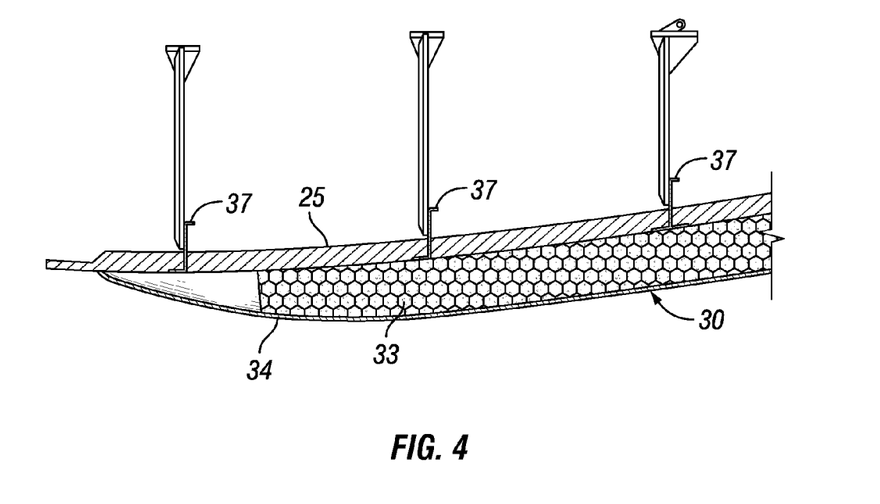
FIG. 4 shows an embodiment of a rub strip with connectors for connecting the rub strip to a fuselage.

FIG. 4 shows an embodiment of a rub strip 30 connected to a fuselage 25. Support members 37 may connect the rub strip 30 to structural members within the fuselage 25 of the aircraft 100. The rub strip 30 includes a core material 33 configured to buckle or collapse upon the application of a force such as during a ground contact during a landing or takeoff of the aircraft 100. The core material 33 is covered by a cover or fairing 34. The fairing 34 may be tapered for aerodynamic purposes. The core material 33 may not extend to the tapered end of the fairing 34 to minimize costs in forming the core material 33. Alternatively, the core material 33 may conform to the shape of the fairing 34. One embodiment of the rub strip 30 may weigh approximately 75 lbs.

Figure 5:
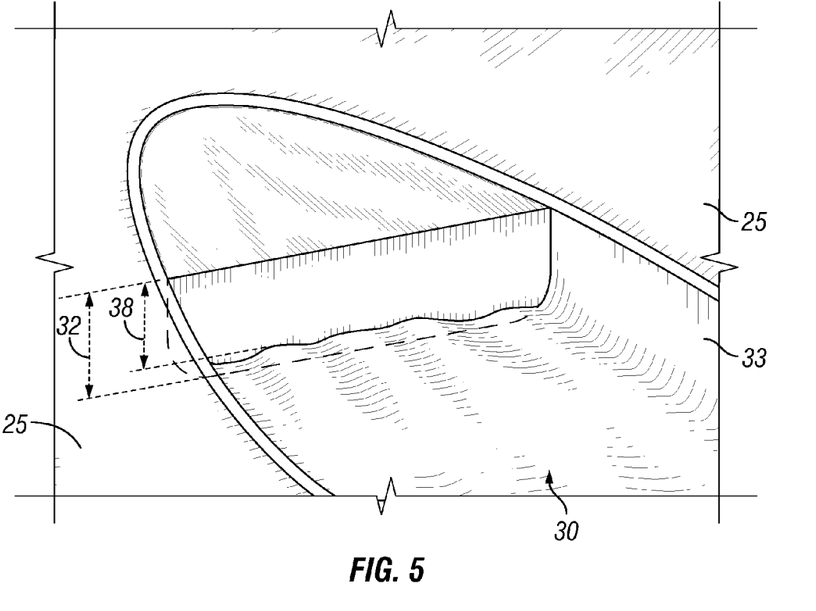
FIG. 5 shows an embodiment of a rub strip with the fairing removed and a portion buckled due to a contact event.

FIG. 5 shows a portion of the core material 33 buckled due to a contact event. The fairing 34 (not shown in FIG. 5) has been removed so that the extent of buckling of the core material 33 can be determined. The thickness 38 of the buckled material can be compared to the thickness 32 of the original core material 33 of the rub strip 30 to determine the amount of energy subjected to the rub strip 30 during the contact event. An inspection of the core material 33 after a contact event may be used to determine whether the structure of the aircraft 100 has been compromised due to the contact event. For example, a threshold buckled thickness can be determined based on the strength of the core material. If the thickness 38 of the buckled core material 33 is greater than or equal to the threshold thickness, the inspector can visually determine that the fuselage 25 of the aircraft 100 has not sustained any damage during the contact event rather than removing the core material 33 and inspecting the fuselage 25. The positioning of the rub strip 30 on the exterior of the fuselage 25 permits the rapid removal and replacement of the rub strip 30 in the event the rub strip 30 is damaged during a contact event.

Figure 7:
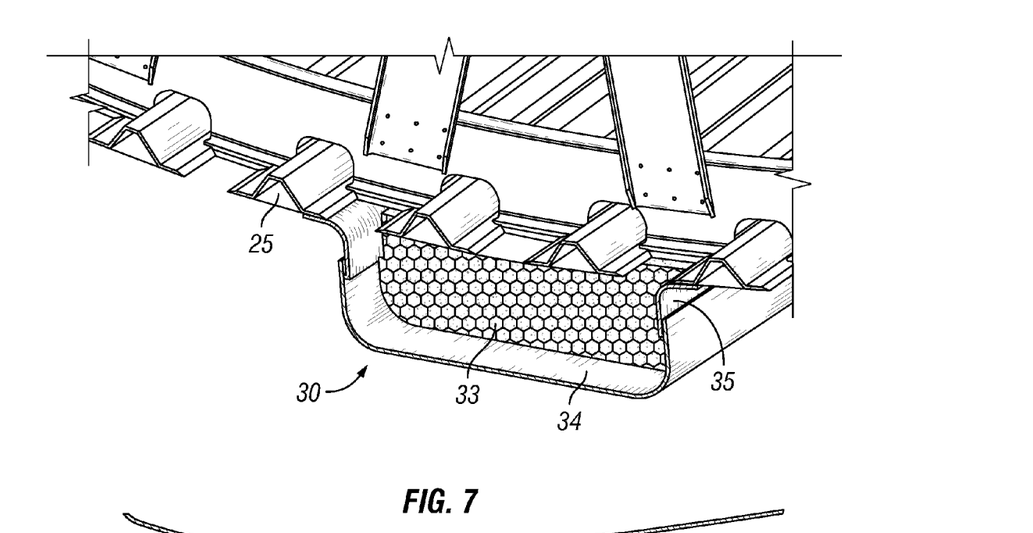
FIG. 7 shows a cross-section view of an embodiment of a rub strip.

FIG. 7 shows a cross-section of an embodiment of a rub strip 30. The rub strip 30 includes a core material 33 that is configured to buckle or crush upon a contact event with the ground. Core material 33 is covered by a fairing 34 that is connected to the fuselage 25 of an aircraft 100 via two mounting rails 35. The mounting rails 35 and fairing 34 may each be comprised of an abrasive-resistant material, such as titanium.

Figure 8:
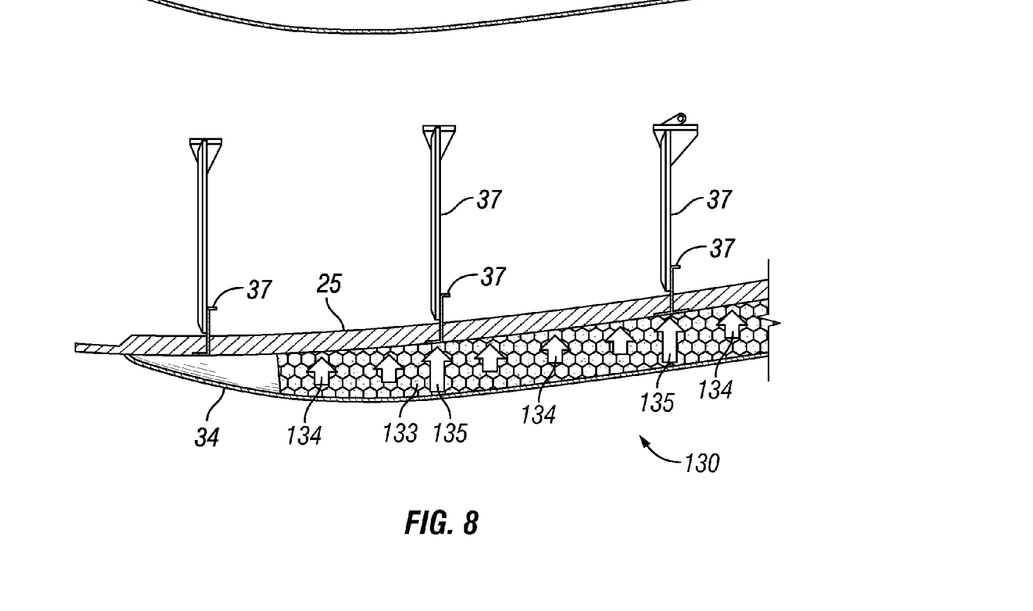
FIG. 8 shows an embodiment of a rub strip having a dual density core.

FIG. 8 shows an embodiment of a rub strip 130 that has a dual density core material 133 covered by a fairing 34. The density, represented by shorter arrows 134, of the core material 133 adjacent the skin of the fuselage 25 has a lower density than the density, represented by longer arrows 135, of the core material 133 adjacent to the support members 37 connected to the fuselage 25. The support members 37 can withstand more force than the skin of the fuselage 25. Thus, the core material 133 that is adjacent to the support members 37 may have a higher density 135 than the density 134 of the core material 133 adjacent the skin. The use of a core material 133 having a dual density may provide a rub strip 130 that withstand a higher force from a ground impact and still potentially protect the fuselage 25 from becoming damaged. The dual density of the material 133 may be formed from aluminum honeycomb material comprised of two differently sized cells within the material 133. Portions of the material 133 having a first density may include a first sized cell or polygonal shaped tube of aluminum with the portions of the material 133 having a second density including a second sized cell of aluminum.

Figure 9:
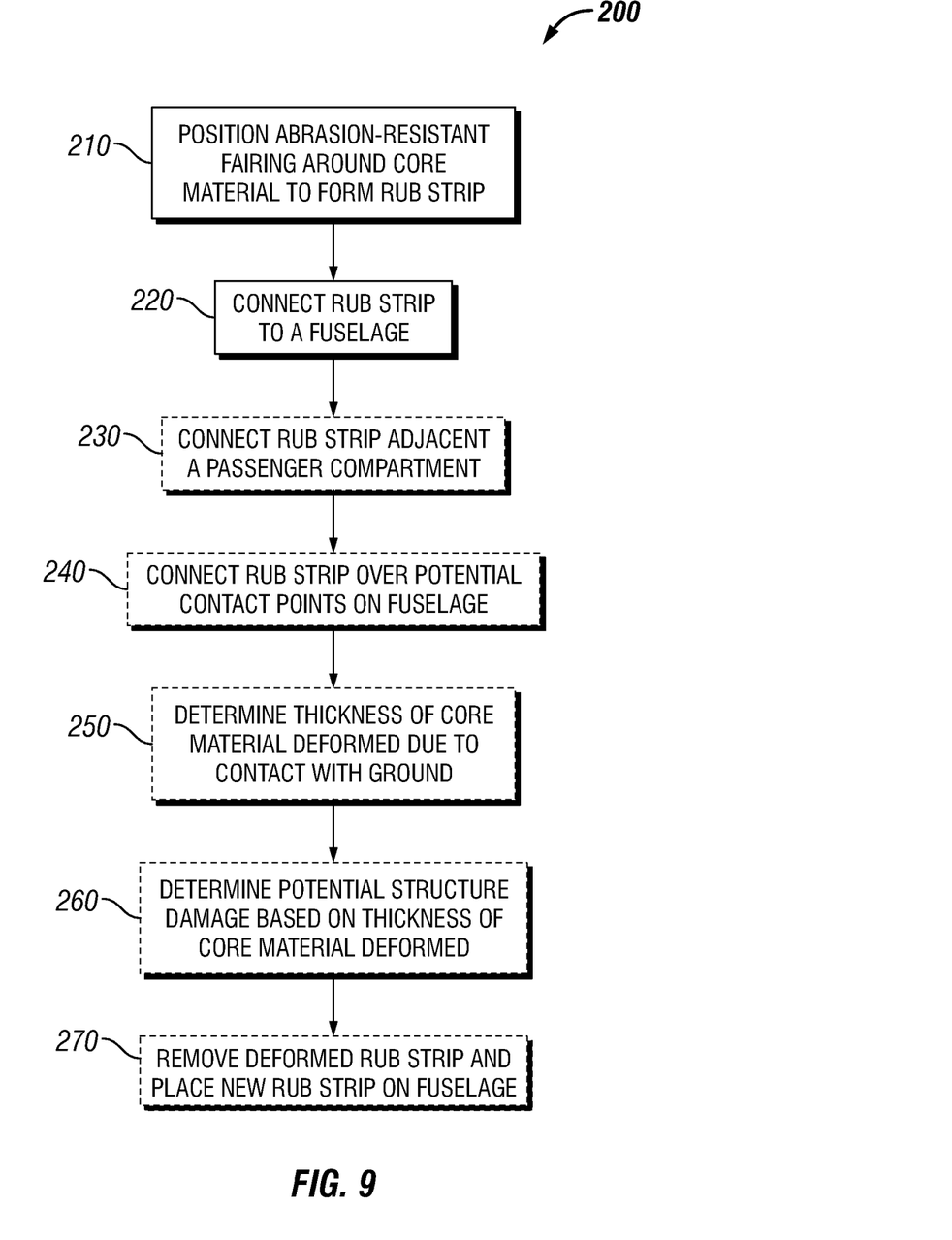
FIG. 9 is a flow diagram of a method of using a rub strip on an aircraft fuselage.

FIG. 9 shows a method 200 of using an energy absorbing rub strip on an aircraft fuselage that includes the step 210 of positioning an abrasion-resistant fairing around a core material configured to collapse upon the application of a force to form a rub strip. The method 200 includes the step 220 of connecting the rub strip to the exterior of a fuselage of an aircraft. The method 200 optionally includes the step 230 of connecting the rub strip to the exterior of the fuselage adjacent to a passenger compartment. The method 200 optionally includes the step 240 of connecting the rub strip over potential initial contact points on the fuselage for ground contact events during landing and takeoff. The method 200 optionally includes the step 250 of determining the thickness of the core material deformed due to contact of the rub strip with the ground during a takeoff or landing of the aircraft. The abrasion-resistant fairing may be removed to permit the inspection of the core material to determine the amount of the core material that has buckled and/or collapsed. The method 200 optionally includes the step 260 of determining potential structural damage of the aircraft based on the thickness of core material deformed. For example, a threshold thickness of core material deformed may be predetermined based on the strength of the core material. If the thickness of the deformation is greater than or equal to a threshold thickness less, than it can be determined the aircraft did not sustain any structural damage. If the thickness of the deformation exceeds the threshold thickness, further investigation may be required. The method 200 optionally includes the step 270 of removing a deformed rub strip and placing a new rub strip on the fuselage of the aircraft.

Figure 10:
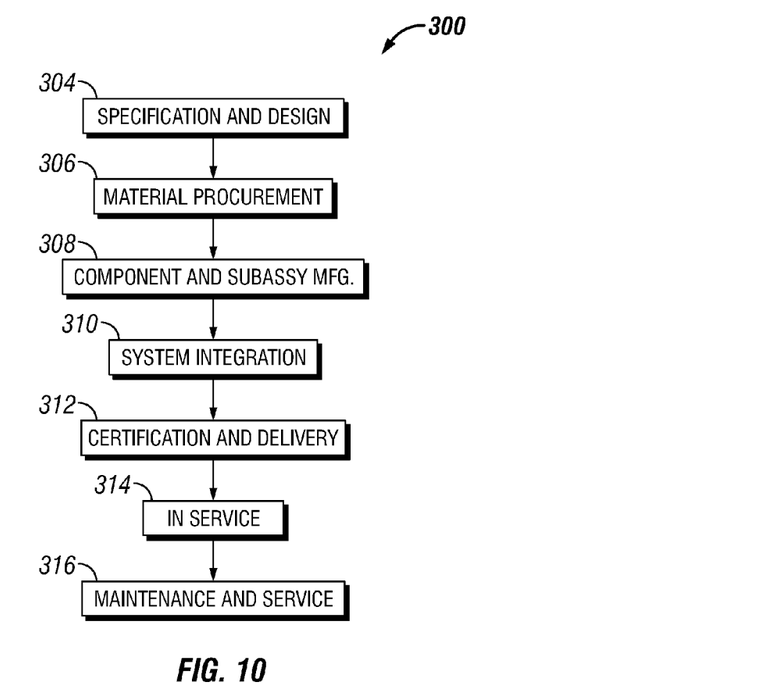
FIG. 10 is an illustration of a flow diagram of an aircraft manufacturing and service methodology.
Figure 11:
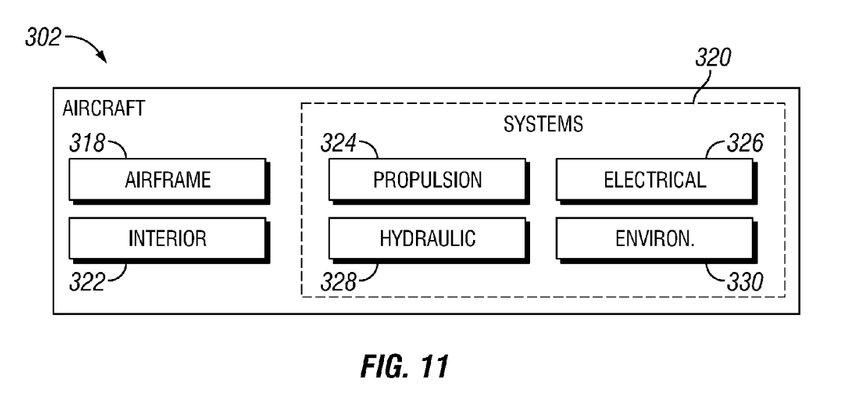
FIG. 11 is an illustration of a block diagram of an aircraft.

Referring to FIGS. 10-11, embodiments of the disclosure may be described in the context of an aircraft manufacturing and service method 300 as shown in FIG. 10 and an aircraft 302 as shown in FIG. 11. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the aircraft manufacturing and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Although various embodiments have been shown and described, the present disclosure is not so limited and will be understood to include all such modifications and variations as would be apparent to one skilled in the art.

What is claimed is:

1. An energy absorbing rub strip system, comprising:
   an aircraft comprising a fuselage;
   a core material having a length, the core material being configured to buckle under an application of a predetermined amount of force; and
   a fairing positioned over the core material, the fairing being configured to be attached to a fuselage of the aircraft adjacent a passenger compartment of the aircraft;
   wherein the core material extends from a potential expected landing contact point on the fuselage to a potential expected takeoff contact point on the fuselage and wherein the entire length of the core material is positioned between a landing gear of the aircraft and a bulkhead that separates the passenger compartment from a tail of the aircraft,
   wherein the potential expected landing contact point is determined from a first vector extended from the landing gear in a landing configuration to the fuselage and wherein the potential expected takeoff contact point is determined from a second vector extended from the landing gear in a takeoff configuration to the fuselage, the takeoff configuration of the landing gear being different from the landing configuration.

2. The system of claim 1, further comprising at least two mounting rails attached to the fairing, wherein the fairing is connected to the fuselage of the aircraft via the mounting rails.

3. The system of claim 2, the fairing and the at least two mounting rails comprised of titanium.

4. The system of claim 1, the core material comprised of aluminum honeycomb.

5. The system of claim 1, the core material comprised of a dual density material.

6. The system of claim 1, the fairing comprised of an abrasion-resistant material.

7. The system of claim 6, the fairing comprised of titanium.

8. The system of claim 6, the fairing comprised of nickel-based metal.

9. A method of using an energy absorbing rub strip on an aircraft fuselage, the method comprising:
- positioning an abrasion-resistant fairing around an exterior portion of a core material to form an energy absorbing rub strip, the core material being configured to buckle under an application of a predetermined amount of force;
- connecting the energy absorbing rub strip having a length to an exterior portion of a fuselage of an aircraft adjacent a passenger compartment of the aircraft;
- determining a potential expected landing contact point by extending a first vector from the landing gear in a landing configuration to the fuselage; and
- determining a potential expected takeoff contact point by extending a second vector from the landing gear in a takeoff configuration to the fuselage, the takeoff configuration of the landing gear being different from the landing configuration;
- wherein the core material extends from the potential expected landing contact point on the fuselage to the potential expected takeoff contact point on the fuselage and wherein the entire length of the energy absorbing rub strip is positioned between the landing gear of the aircraft and a bulkhead that separates the passenger compartment from a tail of the aircraft.

10. The method of claim 9, further comprising connecting the energy absorbing rub strip to the fuselage of the aircraft adjacent to a passenger compartment of the aircraft.

11. The method of claim 9, further comprising:
- determining a thickness of core material deformed upon contact with a ground surface; and
- determining if contact with the ground surface caused any structural damage to the fuselage based on the thickness of core material deformed.

12. The method of claim 11, further comprising replacing the abrasion-resistant fairing and the core material with a second abrasion-resistant fairing around an exterior portion of a second core material to form a second energy absorbing rub strip.

13. The method of claim 11, wherein determining if contact with the ground surface caused any structural damage to the fuselage further comprises determining whether the thickness of core material deformed is greater than or equal to a threshold thickness.

14. An aircraft, the aircraft comprising:
- a fuselage;
- a passenger compartment within an interior of the fuselage;
- a bulkhead separating the passenger compartment from an end of the fuselage with a tail; and
- a rub strip having a length attached to an exterior of the fuselage adjacent to a portion of the passenger compartment, the rub strip comprising an abrasion-resistant fairing around an exterior portion of a core material, wherein the entire length of the rub strip is positioned between a landing gear of the aircraft and the bulkhead;
- wherein the core material extends from a potential expected landing contact point on the fuselage to a potential expected takeoff contact point on the fuselage,
- wherein the potential expected landing contact point is determined from a first vector extended from the landing gear in a landing configuration to the fuselage and wherein the potential expected takeoff contact point is determined from a second vector extended from the landing gear in a takeoff configuration to the fuselage, the takeoff configuration of the landing gear being different from the landing configuration.

15. The aircraft of claim 14, the core material being configured to buckle under an application of a predetermined amount of energy.

16. The aircraft of claim 15, the core material comprising aluminum honeycomb.

17. The aircraft of claim 14, further comprising the core material comprised of a dual density material.

18. The aircraft of claim 14, further comprising the abrasion-resistant fairing comprising titanium or a nickel-based metal.

19. The aircraft of claim 14, wherein a portion of the abrasion-resistant fairing is tapered and the core material does not extend into the tapered portion of the abrasion-resistant fairing.

* * * * *